(12) United States Patent
Cole

(10) Patent No.: US 10,631,419 B1
(45) Date of Patent: Apr. 21, 2020

(54) MOUNTING BRACKET FOR ENCRYPTED TOUCH MODULE

(71) Applicant: DIebold Nixdorf Incorporated, North Canton, OH (US)

(72) Inventor: Robert Michael Cole, New Franklin, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

(21) Appl. No.: 16/274,961

(22) Filed: Feb. 13, 2019

(51) Int. Cl.
  *H05K 7/02* (2006.01)
  *H05K 7/04* (2006.01)
  *H05K 5/02* (2006.01)
  *H05K 5/00* (2006.01)

(52) U.S. Cl.
  CPC ......... *H05K 5/0208* (2013.01); *H05K 5/0204* (2013.01); *H05K 5/0247* (2013.01); *H05K 5/0017* (2013.01)

(58) Field of Classification Search
  USPC ....................................... 361/807
  See application file for complete search history.

(56) References Cited

U.S. PATENT DOCUMENTS

| | | | | |
|---|---|---|---|---|
| 6,111,746 A | * | 8/2000 | Wahl | H05K 9/0015 174/354 |
| 6,572,410 B1 | * | 6/2003 | Volstorf | H01R 13/6585 439/108 |
| 6,621,717 B2 | * | 9/2003 | Tuttle | G11B 5/486 174/358 |
| 7,285,731 B2 | * | 10/2007 | Kohonen | H05K 9/0016 174/351 |

FOREIGN PATENT DOCUMENTS

WO   2018160157 A1   9/2018

\* cited by examiner

*Primary Examiner* — Hung S. Bui
(74) *Attorney, Agent, or Firm* — Blank, McCuskey, Souers & Arbaugh, LPA

(57) ABSTRACT

A mounting bracket comprising a first (top) surface with a slot, second (bottom) surface, and a shield (front) surface extending between the top and bottom surfaces, and two side (right and left) surfaces coupled with the top, bottom, and front surfaces. A cavity is formed by the top, bottom, front, left, and right surfaces. Mounts on the top surface enable a housing to be mounted on the top surface. Mounts coupled with the left and right edge surfaces enable the bracket to mounted on an external surface. Optionally, the top surface may further comprise a hidden mount on the distal edge of the top surface, the hidden mount is hidden when a housing is mounted on the top surface and/or a security pin. When the bracket is mounted to an external surface, the slot in the top surface allows a connector to extend from the cavity to the housing.

13 Claims, 7 Drawing Sheets

MOUNTING BRACKET FOR ENCRYPTED TOUCH MODULE

TECHNICAL FIELD

The present disclosure relates generally to securely mounting electronic modules.

BACKGROUND

Mounting buckets are employed to affix items together. For example a first item may be affixed (mounted) onto a second item.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
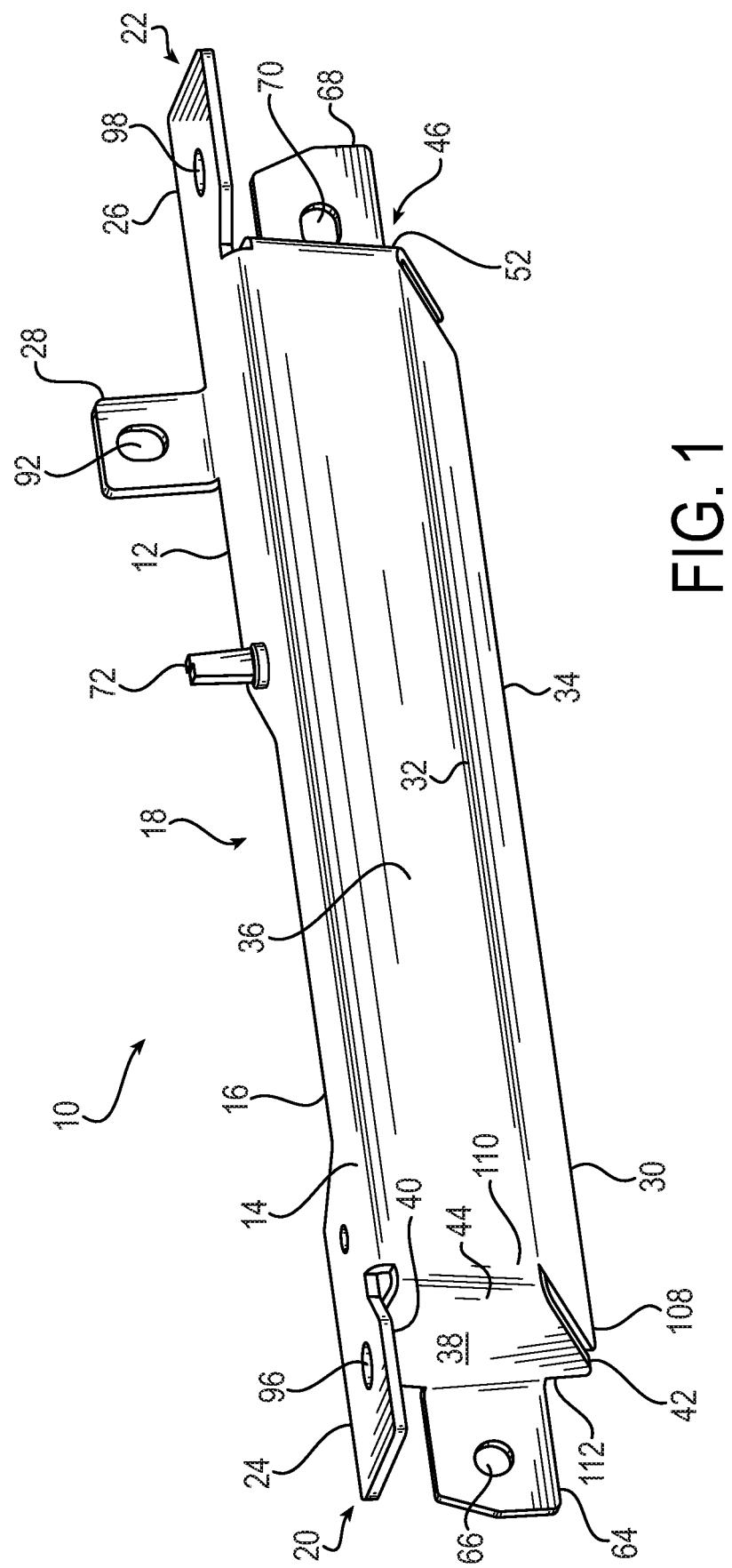
FIG. 1 is perspective view of a mounting bracket in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein a mounting bracket comprising a first surface, second surface, third surface and end surfaces coupled with the first, second, and third surfaces. The first surface having a proximal edge and distal edge. A slot is located at the distal edge of the first surface. the first surface further comprises a first end and a second end opposite the first end, where a first module mount is located at the first end and a second module mount is located at the second end.

The second surface having a proximal edge and a distal edge. The third (or shield) surface extends between the proximal edge of the first surface and the proximal edge of the second surface.

The first end surface is located at the first end of the first surface and the first end of the second surface. The first end surface having a first edge extending between the proximal and distal edges of the first surface, a second edge extending between the proximal and distal edges of the second surface, and a third edge adjacent to the shield surface.

The second end surface is located at the second end of the first surface and the second end of the second surface, the second end having a first edge extending between the proximal and distal edges of the first surface, a second edge extending between the proximal and distal edges of the second surface, and a third edge adjacent to the shield surface.

A first bracket mount extends from the first end surface, the first bracket. The first bracket mount having a first bracket mounting hole for affixing the first bracket mount to an external surface.

A second bracket mount extends from the second end surface. The second bracket having a second bracket mounting hole for affixing the second bracket mount to the external surface/

A hidden mount is located on the distal edge of the first surface. A cavity is formed by the first surface, the second surface, the third surface, the first end surface and the second end surface.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Referring to FIGS. 1-7 there is illustrated a mounting bracket 10 in accordance with an example embodiment. FIG. 1 is perspective view of the mounting bracket 10. The mounting bracket comprise a first surface (the top surface illustrated in FIG. 1) 12, a second (the bottom surface illustrated in FIG. 1) 30, a shield (the front surface illustrated in FIG. 1) 36, and a first end (the left end as illustrated in FIG. 1) 38.

The first surface 12 has a proximal edge 14 and a distal edge 16. A slot 18 located at the distal edge 16 of the first surface 12. The first surface 12 further comprises a first end 20 and a second end 22 opposite the first end 22. A first module mount 24 is located at the first end 20 and a second module mount 26 is located at the second end 22. First mounting hole 96 is located on first module mount 24 and second mounting hole 98 is located on the second module mount 26.

The mounting bracket 10 further comprises a second surface 30 having a proximal edge 32 and a distal edge 34. A shield surface 36 extends between the proximal edge 14 of the first surface 12 and the proximal edge 32 of the second surface 30.

The first end (or left end as illustrated in FIG. 1) surface 38 is located at the first end 20 of the first surface 12 the first end 108 of the second surface 30, and the first end 110 of the shield surface 36. The first end 38 has a first edge 40 extending between the proximal 14 and distal 16 edges of the first surface 12, a second edge 42 extending between the proximal 32 and distal edges 34 of the second surface 30, and a third edge 44 adjacent to the first end 110 of the shield surface 36.

A first bracket mount 64 extends from the fourth edge (rear edge as illustrated in FIG. 1) 112 of first end surface 46. The fourth edge 112 extends from distal edge 16 of the first surface 12 to the distal edge 34 of the second surface 30.

A second bracket mount 68 extends from a fourth edge 114 (FIG. 6) of the second end surface 46. The second bracket mount 68 having a second bracket mounting hole 70 for affixing the second bracket mount 68 to an external surface.

A hidden mount 28 located on the distal edge 16 of the first surface 12. The hidden mount comprises a mounting hole 92.

Figure 8:
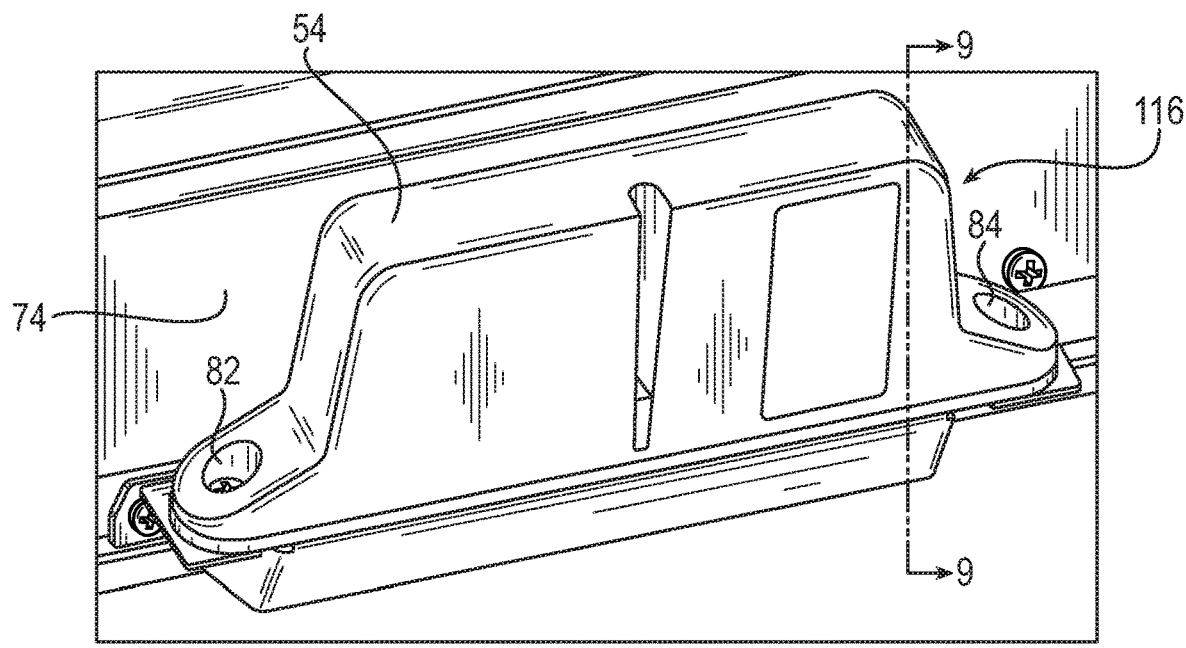
FIG. 8 illustrates an example of the mounting bracket in FIG. 1 coupled with an external surface and having an electronic module mounted thereon.
Figure 9:
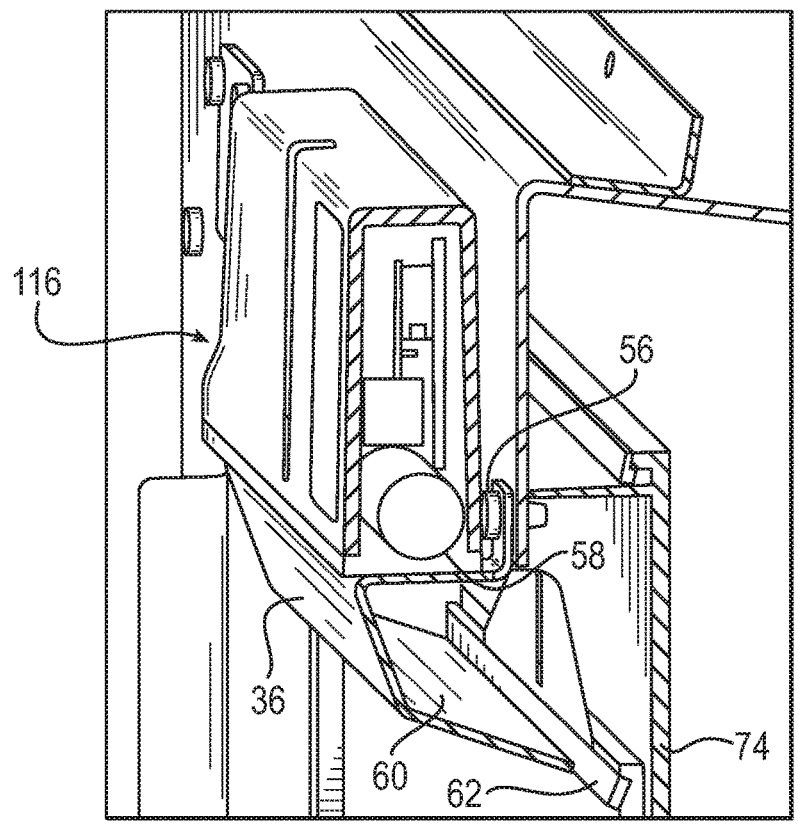
FIG. 9 is a cutaway view of the example illustrated in FIG. 8 along line A-A.
Figure 11:
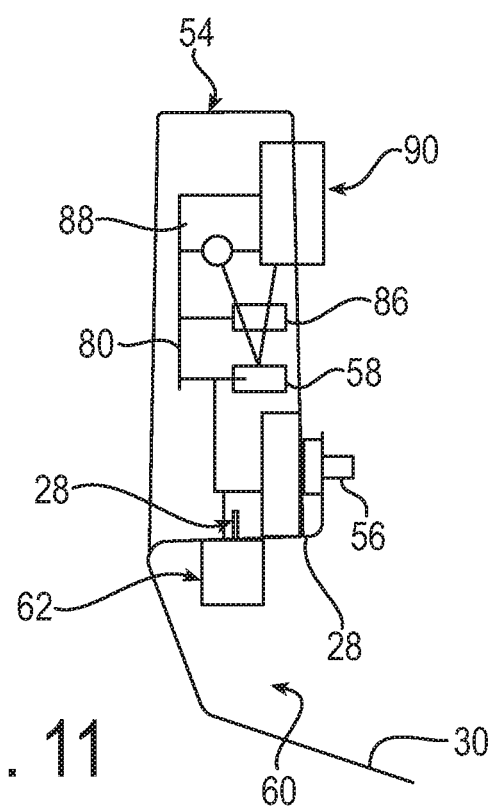
FIG. 11 is a block diagram illustrating an example side view of an encrypted personal identification number pad mounted on the mounting bracket illustrated in FIG.

A cavity 60 (FIG. 9; FIG. 11) is formed by the first surface 12, the second surface 30, the third surface 36, the first end surface 38, and the second end surface 46. As those skilled in the art can readily appreciate, when the mounting bracket 10 is mounted on an external surface (see e.g., 74 in FIG. 7), the first, second, third, first end, and second end surfaces prevent access to the cavity 60. This can protect wires or other equipment that may be used by the device mounted on the mounting bracket 10. Those skilled in the art should readily appreciate, that while the mounting bracket 10 is mounted to an external surface and a housing (see e.g., 54; FIG. 8) for a module is mounted on first surface 12, the housing of the module prevents access from the to the hidden mount 28, and therefore any fastener connected thereto.

Figure 2:
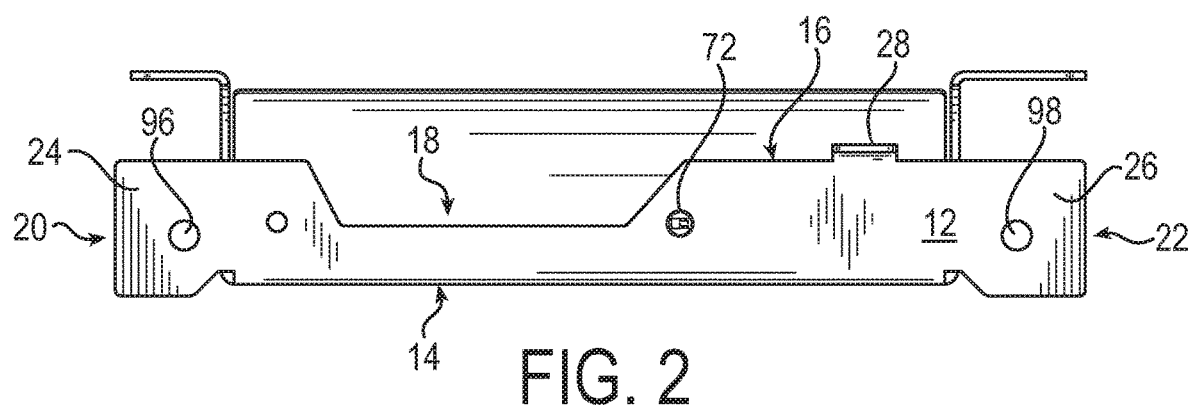
FIG. 2 is a top view of the mounting bracket illustrated in FIG. 1.
Figure 3:
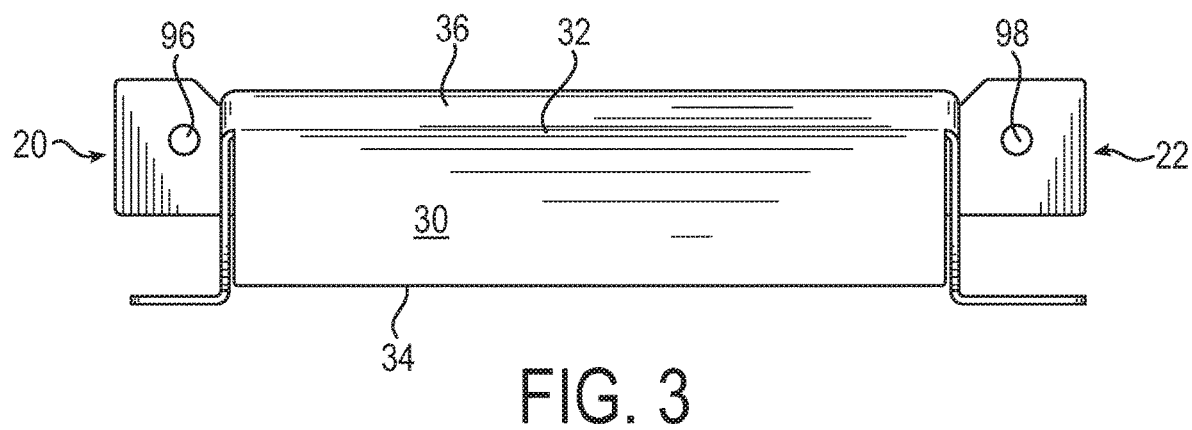
FIG. 3 is a bottom view of the mounting bracket illustrated in FIG. 1.
Figure 4:
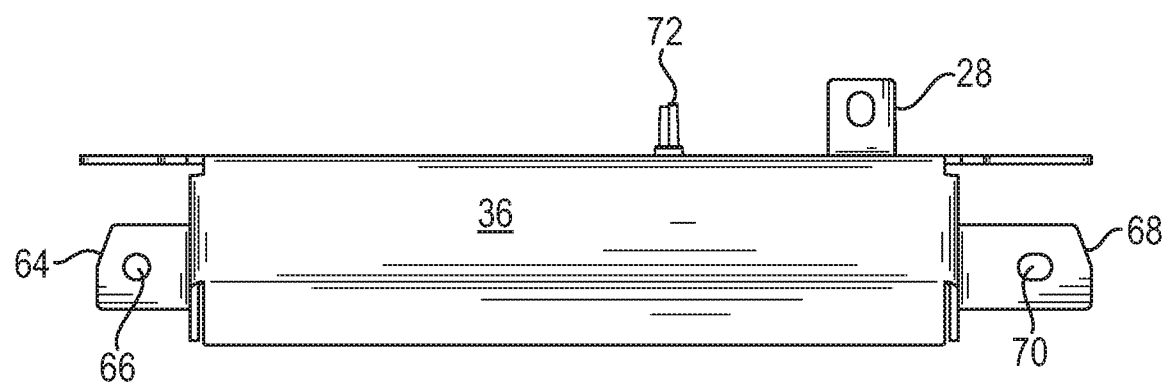
FIG. 4 is a front view of the mounting bracket illustrated in FIG. 1.
Figure 5:
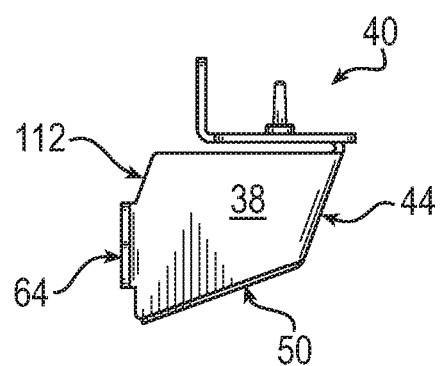
FIG. 5 is a left side view of the mounting bracket illustrated in FIG. 1.

FIG. 2 illustrates a top view of the mounting bracket 10.
FIG. 3 illustrates a bottom view of the mounting bracket 10.
FIG. 4 illustrates a front view of the mounting bracket 10.
FIG. 5 illustrates the first (e.g., left) end surface 38. The first end 38 comprises a first (top) edge 40, second (bottom) 42 edge, third (front or shield) edge 44, and a fourth edge 112.

Figure 6:
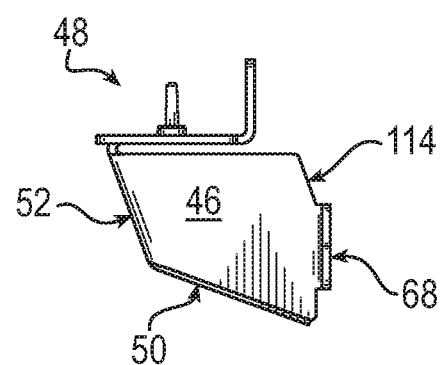
FIG. 6 is a right side view of the mounting bracket illustrated in FIG. 1.

FIG. 6 illustrates the second (e.g., right) end surface 46. The second end 46 comprises a first (top) edge 48, a second (bottom) edge 50, a third (front or shield) edge 52, and a fourth (rear) edge 114. In the illustrated example, the first edge 48 extends between the proximal 14 and distal 16 edges of the first surface 12, the second edge extends between the proximal 32 and distal 34 edges of the second surface 30, the third edge 52 is adjacent to the shield surface 36 and extends from the proximal edge 14 of the first surface 12 to the proximal surface 32 of the second surface 30, and a fourth edge extending from the distal edge 16 of the first surface to the distal edge 34 of the second surface 30.

Figure 7:
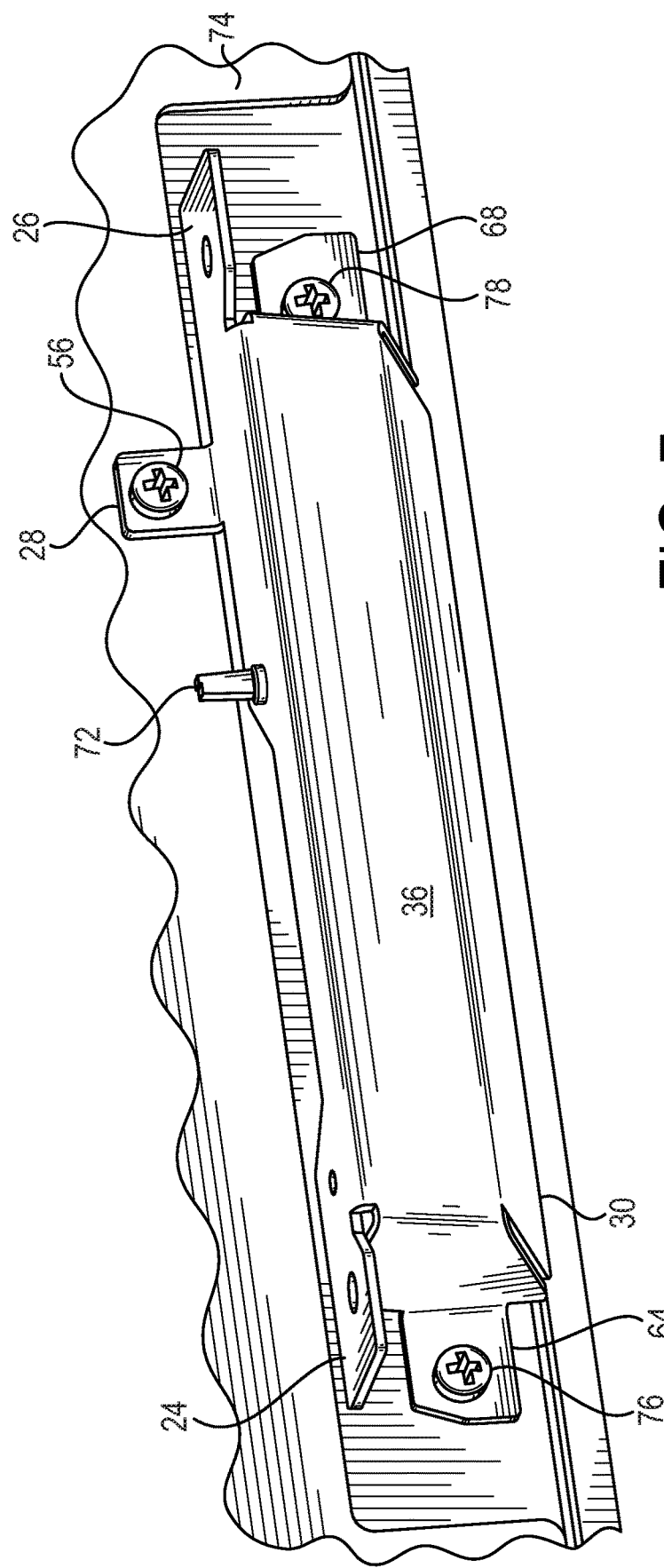
FIG. 7 illustrates an example of the mounting bracket in FIG. 1 coupled with an external surface.

FIG. 7 illustrates an example of the mounting bracket 10 mounted on to an external surface 74. The fasteners mounting bracket is 56, 76, and 78 in mounting holes 92, 46, 48 respectively mechanically coupled the mounting bracket 10 with the external surface 74. In the illustrated example, fasteners 56, 76, and 78 are screws, however, those skilled in the art should readily appreciate that any suitable fastener may be employed.

Figure 10:
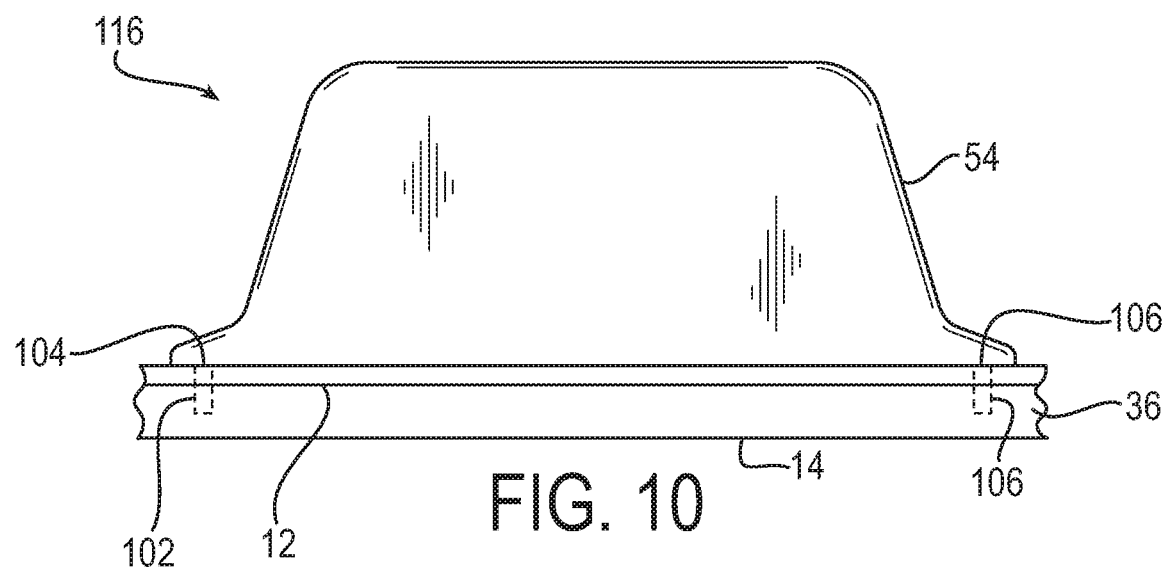
FIG. 10 illustrates an example of a rear view of the mounting bracket in FIG. 1 with an electronic module mounted thereon.

FIG. 8 illustrates an example of the mounting bracket 10 in FIG. 1 coupled with an external surface 74 and having an electronic module mounted 116 thereon. the electronic module 116 comprises a housing 54 with mounts 82, 84 that are positioned to be aligned with the first and second module mounts 24, 26 respectively. As illustrated in FIG. 10, fasteners 106, 104 mechanically engage the mounts 82, 84 of the housing 54 with the mounts 24, 26 of the first surface 12. In an example embodiment, the fasteners 104, 106 are screws, however, those skilled in the art should readily appreciate that any suitable fastener can be employed.

FIG. 9 is a cutaway view of the example illustrated in FIG. 8 along line A-A. In an example embodiment, a feature of mounting bracket 10 is that the surfaces 12, 30, 36, 38, 46 prevents access to a ribbon cable 62 within cavity 60. For example, shield surface 36 prevents access to the ribbon cable 62 from the front of the mounting bracket 10. The ribbon cable 62 passes from cavity 62 through slot 18 to be coupled with electronic module 116. Although the illustrated example features a ribbon cable, those skilled in the art can readily appreciate that any suitable types of conductors may be provided to electronic module 116 via cavity 60 and slot 18.

In an example embodiment, a feature of mounting bracket 10 is that access to hidden mounting 28 and fastener 56 are blocked from the front (e.g., the proximal edge 14 of first surface 12) of the mounting bracket 10 by the housing 54 of the electronic module 116 while the housing is mounted onto the mounting bracket 10. This can prevent removal of the electronic module 116 from the mounting bracket 10.

FIG. 11 is a block diagram illustrating an example side view of an encrypted personal identification number ("PIN") pad (or "EPP") mounted on the mounting bracket 10 illustrated in FIG. 1. As in the example illustrated in FIG. 9, the cavity 60 prevents access to the ribbon cable 62 coupled to the EPP. The EPP comprises a battery 58, a controller 86, a volatile memory (e.g., Random Access Memory or "RAM") 88, a keypad 90 that are coupled together with a circuit 80 and located within housing 54.

In an example embodiment, keying material is stored in the memory 88 for keypad 90, and in particular embodiments controller 86. A loss of power to the memory 88 will cause the keying material stored in memory 88 to be lost.

In an example embodiment, the controller 86 employs logic to control the operation of the EPP. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that performs the desired functionality when executed by a processor. In the event power is lost, the controller 86 becomes in operable. The controller may be programmed so that the controller 86 cannot be rebooted unless performed by an authorized service person.

In an example embodiment, the location of the battery 58 and/or hidden mount 28 are selected so that the fastener 56 is aligned with the battery 58. Thus, if an attempt is made to drill through the fastener 56 (e.g., from the front or rear), the battery 58 will be destroyed, thus causing a loss of power to the memory 88 and/or controller 86 causing any data in memory 88 (such as keying data employed by keypad 90 and/or controller 86) to be lost (e.g., erased) and/or the controller 86 to become inoperable.

In an example embodiment, the security pin 72 is positioned on first surface 12 in order to be inserted into the housing 54 (in this example an EPP but those skilled in the art should readily appreciate the security pin 72 may be employed with any type of electronic component). Forcible removal of the housing 54 from the first surface 12 of mounting bracket 10 will cause damage to the battery 58 and/or circuit 80 depending on the location of the security pin 72. This will cause a loss of power to the memory 88 and/or controller 86 causing any data in memory 88 (such as keying data employed by keypad 90 and/or controller 86) to be lost (e.g., erased) and/or the controller 86 to become inoperable.

The description of the example embodiments includes terms relating to the orientation of the mounting bracket such as top, bottom, front, rear, left, and right. As those skilled in the art can readily appreciate, these terms were selected merely for ease of illustration with respect to the illustrations provided herein and that the mounting bracket may be positioned at any angle, and thus any surface may be perceived as a top, bottom, front, rear, left, or right surface depending upon the viewpoint. Therefore, the claims should not be construed to be limited as to which surface is the top, bottom, front, rear, left, or right surfaces.

Figure 12:
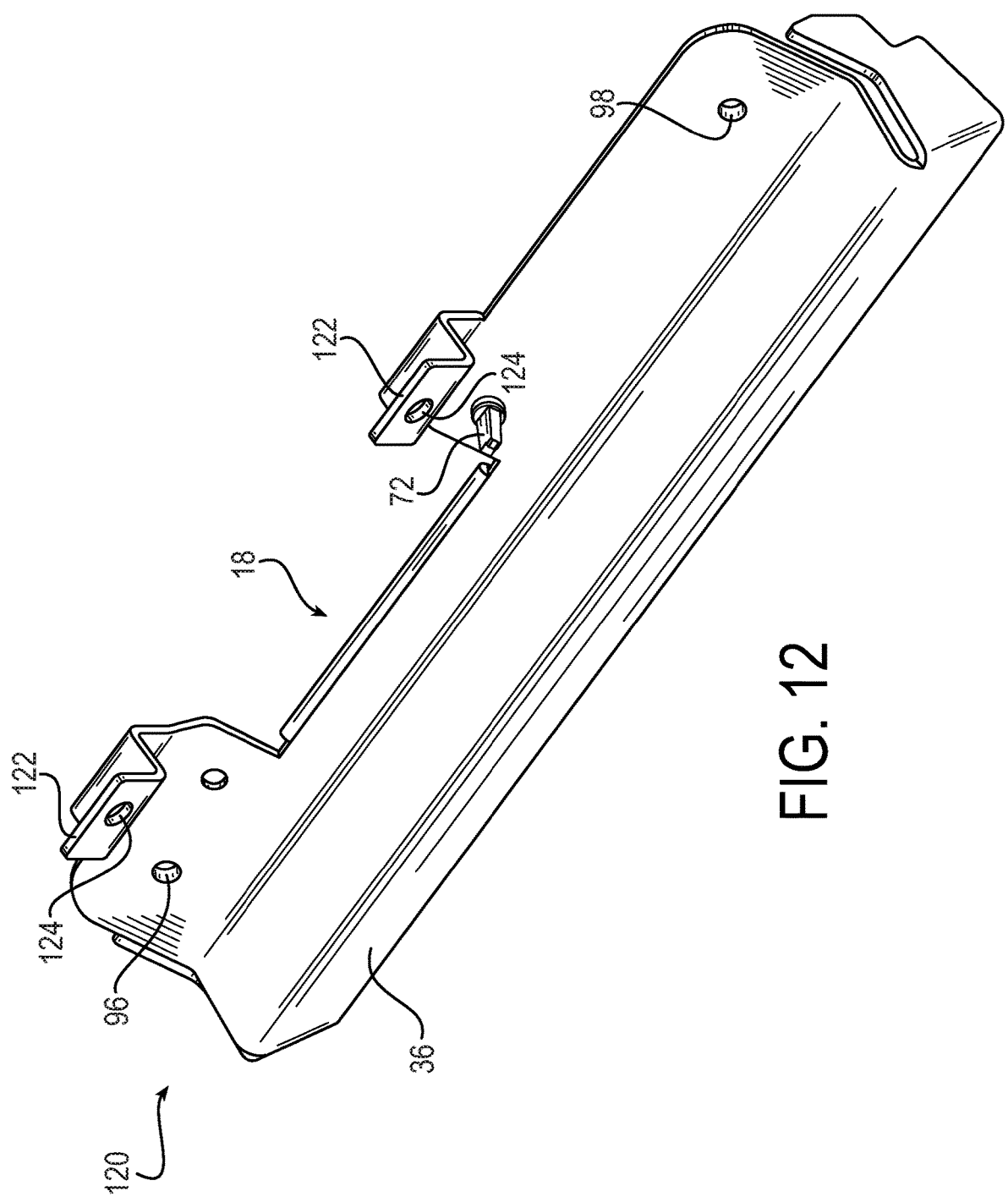
FIG. 12 is perspective view of a mounting bracket with two hidden mounts.

FIG. 12 is perspective view of a mounting bracket 120 in accordance with an example embodiment. The mounting bracket 120 comprises two hidden mounts 28, 122 with corresponding mounting holes 92, 124 respectively. Hidden mounts are hidden when a module is mounted onto the bracket 120. In an example embodiment, at least one of hidden mounts 28, 122 are positioned adjacent to the battery of the module so that any attempt to drill out screws in either or both of mounting holes 92, 124 will result in damage of the battery, causing the electronic module to lose power and thus erase any sensitive data (such as encryption keys) stored in volatile memory and the module to cease functioning.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a first surface having a proximal edge and a distal edges, a slot located at the distal edge of the first surface, a first end, a second end opposite the first end, a first module mount located at the first end and a second module mount located at the second end;
   a second surface having a proximal edge and a distal edge;
   a shield surface extending between the proximal edge of the first surface and the proximal edge of the second surface;
   a first end surface located at the first end of the first surface and the first end of the second surface, the first end having a first edge extending between the proximal and distal edges of the first surface, a second edge extending between the proximal and distal edges of the second surface, and a third edge adjacent to the shield surface;
   a second end surface located at the second end of the first surface and the second end of the second surface, the second end having a first edge extending between the proximal and distal edges of the first surface, a second edge extending between the proximal and distal edges of the second surface, and a third edge adjacent to the shield surface;
   a first bracket mount extending from a fourth edge of the first end surface, the first bracket having a first bracket mounting hole for affixing the first bracket mount to an external surface;
   a second bracket mount extending from a fourth edge of the second end surface, having a second bracket mounting hole for affixing the second bracket mount to the external surface; and
   a hidden mount located on the distal edge of the first surface;
   wherein a cavity is formed by the first surface, the second surface, the third surface, the first end surface, and the second end surface.

2. The apparatus set forth in claim 1, the hidden mount further comprises a hidden mounting hole.

3. The apparatus set forth in claim 2, further comprising:
   a housing with first and second mounts positioned to align with the first and second module mounts respectively;
   a battery within the housing positioned to align with the hidden mount while the housing is mounted onto the mounting bracket,
   a controller within the housing;
   a volatile memory within the housing;
   a circuit within the housing coupling the batter, controller, and volatile memory;
   wherein the volatile memory stores keying material employed by the controller first and second fasteners coupling the mounting bracket with an external surface via the first and second mounting holes respectively; and
   a third fastener coupling the hidden mount with the external surface;
   wherein access to the hidden mount and third fastener is blocked from the proximal edge of the mounting bracket by the housing while the housing is mounted onto the mounting bracket; and
   wherein drilling through the third fastener from the distal edge will cause damage to the battery, which causes the keying material to be erased from the memory and the controller to become inoperable.

4. The apparatus set forth in claim 3, further comprising:
   an electrical conductor extending from the cavity through the slot, and coupled with the circuit within the housing.

5. The apparatus set forth in claim 4, wherein the electrical conductor comprises a ribbon cable.

6. The apparatus set forth in claim 3, further comprising a keypad affixed to the housing and coupled with the circuit.

7. The apparatus set forth in claim 3, wherein the first, second, and third fasteners are screws.

8. The apparatus set forth in claim 3, further comprising:
   the first module mount having a first module mounting hole and the second module mount having a second module mounting hole; and
   fourth and fifth fasteners coupling the housing with the first surface via the first module mounting hole and the second module mounting hole respectively.

9. The apparatus set forth in claim 8, wherein the fourth and fifth fasteners are screws.

10. The apparatus set forth in claim 3, further comprising:
    a security pin coupled with the first surface between the proximal and distal edges of the first surface, the security pin engages the housing while the housing is mounted on the mounting bracket;

wherein attempting to remove the housing from the mounting bracket will cause the security pin to damage to the circuit, which causes the keying material to be erased from the memory and the controller to become inoperable.

11. An apparatus, comprising:
a mounting bracket, the mounting bracket comprises:
  a first surface having a proximal edge and a distal edges, a slot located at the distal edge of the first surface, a first end, a second end opposite the first end, a first module mount located at the first end and a second module mount located at the second end,
  a second surface having a proximal edge and a distal edge,
  a shield surface extending between the proximal edge of the first surface and the proximal edge of the second surface,
  a first end surface located at the first end of the first surface and the first end of the second surface, the first end having a first edge extending between the proximal and distal edges of the first surface, a second edge extending between the proximal and distal edges of the second surface, and a third edge adjacent to the shield surface,
  a second end surface located at the second end of the first surface and the second end of the second surface, the second end having a first edge extending between the proximal and distal edges of the first surface, a second edge extending between the proximal and distal edges of the second surface, and a third edge adjacent to the shield surface,
  a first bracket mount extending from a fourth edge of the first end surface, the first bracket having a first bracket mounting hole for affixing the first bracket mount to an external surface,
  a second bracket mount extending from a fourth edge of the second end surface, having a second bracket mounting hole for affixing the second bracket mount to the external surface,
  a hidden mount located on the distal edge of the first surface, and
  a security pin mounted on the first surface between the proximal and distal edges,
  wherein a cavity is formed by the first surface, the second surface, the third surface, the first end surface, and the second end surface;
an encrypting personal identification number pad that comprises:
  a housing with first and second mounts positioned to align with the first and second module mounts respectively,
  a battery within the housing positioned to align with the hidden mount while the housing is mounted onto the mounting bracket,
  a controller within the housing
  a volatile memory within the housing,
  a keypad affixed to the housing
  a circuit within the housing coupling the batter, controller, volatile memory, and keypad,
  wherein the volatile memory stores keying material employed by the controller and the keypad; and
a ribbon cable extending from the cavity through the slot and is coupled with the circuit;
first and second fasteners coupling the mounting bracket with an external surface via the first and second mounting holes respectively; and a third fastener coupling the hidden mount with the external surface;
wherein access to the hidden mount and third fastener is blocked from the proximal edge of the mounting bracket by the housing of the electronic personal identification number pad while the encrypting personal identification number pad is mounted onto the mounting bracket; and
wherein drilling through the third fastener from the distal edge will cause damage to the battery, which causes the keying material to be erased from the memory and the controller to become inoperable.

12. The apparatus set forth in claim 11, further comprising:
the security pin engages the housing of the personal identification number pad while the personal identification number pad is mounted on the mounting bracket;
wherein attempting to remove the housing of the personal identification number pad from the mounting bracket will cause the security pin to cause damage to the circuit, which causes the keying material to be erased from the memory and the controller to become inoperable.

13. An apparatus, comprising:
a mounting bracket, the mounting bracket comprises:
  a first surface having a proximal edge and a distal edges, a slot located at the distal edge of the first surface, a first end, a second end opposite the first end, a first module mount located at the first end and a second module mount located at the second end,
  a second surface having a proximal edge and a distal edge,
  a shield surface extending between the proximal edge of the first surface and the proximal edge of the second surface,
  a first end surface located at the first end of the first surface and the first end of the second surface, the first end having a first edge extending between the proximal and distal edges of the first surface, a second edge extending between the proximal and distal edges of the second surface, and a third edge adjacent to the shield surface,
  a second end surface located at the second end of the first surface and the second end of the second surface, the second end having a first edge extending between the proximal and distal edges of the first surface, a second edge extending between the proximal and distal edges of the second surface, and a third edge adjacent to the shield surface,
  a first hidden mount located on the distal edge of the first surface,
  a second hidden mount located on the distal edge of the first surface, and
  a security pin mounted on the first surface between the proximal and distal edges,
  wherein a cavity is formed by the first surface, the second surface, the third surface, the first end surface, and the second end surface;
an encrypting personal identification number pad that comprises:
  a housing with first and second mounts positioned to align with the first and second module mounts respectively,
  a battery within the housing positioned to align with at least one hidden mount selected from the group consisting of the first hidden mount and the second hidden mount while the housing is mounted onto the mounting bracket,
a controller within the housing
a volatile memory within the housing,
a keypad affixed to the housing
a circuit within the housing coupling the batter, controller, volatile memory, and keypad,
wherein the volatile memory stores keying material employed by the controller and the keypad; and
a ribbon cable extending from the cavity through the slot and is coupled with the circuit;
first and second fasteners coupling the mounting bracket with an external surface via the first and second mounting holes respectively; and
a third fastener coupling the first hidden mount with the external surface
a fourth fastener coupling the second hidden mount with the external surface;
wherein access to the first hidden mount and third fastener is blocked from the proximal edge of the mounting bracket by the housing of the electronic personal identification number pad while the encrypting personal identification number pad is mounted onto the mounting bracket;
wherein drilling through the third fastener from the distal edge will cause damage to the battery, which causes the keying material to be erased from the memory and the controller to become inoperable; and
wherein access to the second hidden mount and fourth fastener is blocked from the proximal edge of the mounting bracket by the housing of the electronic personal identification number pad while the encrypting personal identification number pad is mounted onto the mounting bracket.

* * * * *